United States Patent
Krzymien et al.

(10) Patent No.: US 9,521,587 B2
(45) Date of Patent: Dec. 13, 2016

(54) SYSTEM AND METHOD FOR DETERMINING A CLEAR CHANNEL ASSESSMENT THRESHOLD

(71) Applicant: FutureWei Technologies, Inc., Plano, TX (US)

(72) Inventors: Lukasz Krzymien, Rolling Meadows, IL (US); George Calcev, Hoffman Estates, IL (US); Lin Cai, Schaumburg, IL (US); Hanan J. Ahmed, Schaumburg, IL (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 355 days.

(21) Appl. No.: 14/103,535

(22) Filed: Dec. 11, 2013

(65) Prior Publication Data
US 2015/0163824 A1    Jun. 11, 2015

(51) Int. Cl.
*H04W 28/18* (2009.01)
*H04W 74/08* (2009.01)
*H04W 74/00* (2009.01)

(52) U.S. Cl.
CPC ............. *H04W 28/18* (2013.01); *H04W 74/00* (2013.01); *H04W 74/0808* (2013.01); *Y02B 60/50* (2013.01)

(58) Field of Classification Search
None
See application file for complete search history.

(56) References Cited

U.S. PATENT DOCUMENTS 6,169,761 B1 *  1/2001  Marcoccia et al. ........... 375/132
6,870,808 B1 *  3/2005  Liu et al. ...................... 370/203
2004/0073678 A1 *  4/2004  Border et al. ................ 709/227
2006/0092889 A1 *  5/2006  Lyons et al. .................. 370/338
2007/0270102 A1    11/2007  Zhu et al.
2007/0286122 A1 * 12/2007  Fonseca ........................ 370/329
2008/0008133 A1    1/2008  Zhu et al.
2010/0014492 A1 *  1/2010  Budampati et al. .......... 370/338
2012/0009874 A1 *  1/2012  Kiukkonen et al. ......... 455/41.2
2012/0250532 A1 * 10/2012  Husted et al. ................ 370/252
2013/0017794 A1 *  1/2013  Kloper et al. ............... 455/63.1

(Continued)

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) Specifications," IEEE Draft P802.11-REVmb/D12, Nov. 2011, 2910 pages.

(Continued)

*Primary Examiner* — Hong Cho
(74) *Attorney, Agent, or Firm* — Futurewei Technologies, Inc.

(57) ABSTRACT

In one embodiment, a method for setting a clear channel assessment (CCA) threshold includes receiving, by a station from a first access point, a first message including an information element and determining a CCA threshold in accordance with the information element. The method also includes detecting a power level of a channel between the station and the access point to produce a first detected power level and comparing the first detected power level and the CCA threshold. Additionally, the method includes transmitting, by the station to the first access point on the channel, a second message when the detected power level is less than the CCA threshold.

28 Claims, 4 Drawing Sheets

(56) References Cited

U.S. PATENT DOCUMENTS

2013/0188506 A1* 7/2013 Cheong et al. ............... 370/252

OTHER PUBLICATIONS

Mhatre, et al., "Optimal Design of High Density 802.11 WLANs," in ACM CoNEXT, Lisboa, Portugal, Dec. 4-7, 2006, 12 pages.
Zhu et al., "Adaptive CSMA for Scalable Network Capacity in High-Density WLAN: A Hardware Prototyping Approach," INFOCOM 2006, 25th IEEE International Conference on Computer Communications Proceedings, Apr. 2006, pp. 1-10.
International Search Report and Written Opinion of Patent Cooperation Treaty (PCT), International Application No. PCT/US2014/069613, Applicant Huawei Technologies Co., Ltd, date of mailing Feb. 26, 2015, 10 pages.

* cited by examiner

SYSTEM AND METHOD FOR DETERMINING A CLEAR CHANNEL ASSESSMENT THRESHOLD

TECHNICAL FIELD

The present invention relates to a system and method for wireless communications, and, in particular, to a system and method for determining a clear channel assessment threshold.

BACKGROUND

Wireless local area networks (WLANs) media access control (MAC) protocols perform carrier sensing to avoid collisions. The MAC protocol employs carrier sense multiple access with collision avoidance (CSMA/CA) that avoids collisions by transmitting only when the channel is determined to be idle. CSMA is a probabilistic MAC protocol in which a node verifies the absence of other traffic before transmitting messages on the shared transmission medium. By avoiding collisions, CSMA/CA improves the performance. In CSMA/CA, when a channel is sensed busy before transmission, the transmission is deferred for a random interval. This reduces the probability of collisions in the channel.

Dense deployment of WLANs is becoming more common. Dense environments contain large numbers of access points located in a given area. In a dense environment, there is a high chance that some stations are located very close to their associated access point, which results in a low path loss, and therefore high quality of the link.

SUMMARY

An embodiment method for setting a clear channel assessment (CCA) includes receiving, by a station from a first access point, a first message including an information element and determining a CCA threshold in accordance with the information element. The method also includes detecting a power level of a channel between the station and the access point to produce a first detected power level and comparing the first detected power level and the CCA threshold. Additionally, the method includes transmitting, by the station to the first access point on the channel, a second message when the detected power level is less than the CCA threshold.

Another embodiment method for setting a clear channel assessment (CCA) threshold includes receiving, by a station from an access point, a first message and determining a first CCA threshold in accordance with the first message. The method also includes detecting a power level of a channel between the station and the access point to produce a first detected power level and selecting the first CCA threshold or a second CCA threshold to produce a selected CCA threshold. Additionally, the method includes comparing the first detected power level and the selected CCA threshold and transmitting, by the station to the access point on the channel, a second message when the detected power level is less than the selected CCA threshold.

An additional embodiment method for setting a clear channel assessment (CCA) threshold includes receiving, by an access point from a first station, a first message and receiving, by the access point from a second station, a second message. The method also includes determining a first CCA threshold for the first station in accordance with the first message, the second message, and fairness between the first station and the second station and determining a second CCA threshold for the second station in accordance with the first message, the second message, and fairness between the first station and the second station. Additionally, the method includes transmitting, by the access point to the first station, a third message including the first CCA threshold and transmitting, by the access point to the second station, a fourth message including the second CCA threshold.

An embodiment station includes a processor and a computer readable storage medium storing programming for execution by the processor. The programming including instructions to receive, from an access point, a first message including an information element and determine a CCA threshold in accordance with the information element. The programming also includes instructions to detect a power level of a channel by the station to produce a first detected power level and compare the first detected power level and the CCA threshold. Additionally, the programming includes instructions to transmit, to the access point on the channel, a second message when the detected power level is less than the CCA threshold.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
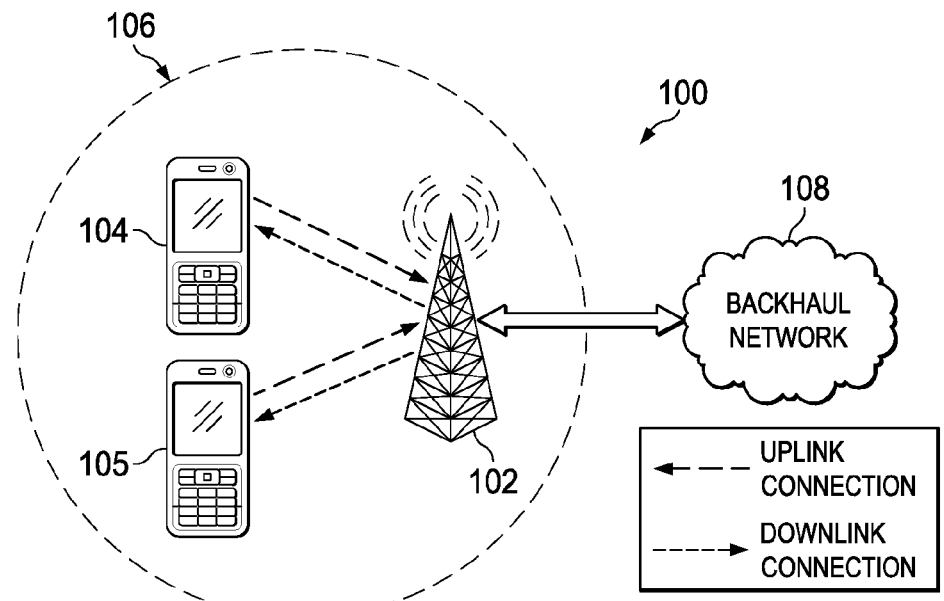
FIG. 1 illustrates a diagram of a wireless network for communicating data.

FIG. 1 illustrates network 100 for communicating data. Network 100 comprises access point (AP) 102 having a coverage area 106, a plurality of stations, including station 104 and station 105, and backhaul network 108. Two stations are pictured, but many more may be present. Access point 102 may be any component capable of providing wireless access by, inter alia, establishing uplink (dashed line) and/or downlink (dotted line) connections with station 104 and station 105, such as a base station, an enhanced node base station (eNodeB), a femtocell, and other wirelessly enabled devices. Station 104 and station 105 may be any component capable of establishing a wireless connection with access point 102, such as cell phones, smart phones, tablets, sensors, etc. Backhaul network 108 may be any component or collection of components that allow data to be exchanged between access point 102 and a remote end (not shown). In some embodiments, the network 100 may comprise various other wireless devices, such as relays, femtocells, etc.

When access points are densely deployed, there is a greater chance that some stations are located very close to their associated AP, leading to a short communications distance, and therefore a low path loss. A station that is sufficiently close to its serving AP may be able to tolerate a higher interference level from simultaneous transmissions. Thus, a higher throughput may be achievable despite the concurrent transmissions in the network. Stations compare the received energy to a clear channel assessment (CCA) threshold to determine whether the channel is idle. When the channel is idle, the station may start a new transmission. In one example, the CCA threshold is distributively set for each station, for example based on metrics related to distance or path loss between the station and its associated AP.

Figure 2:
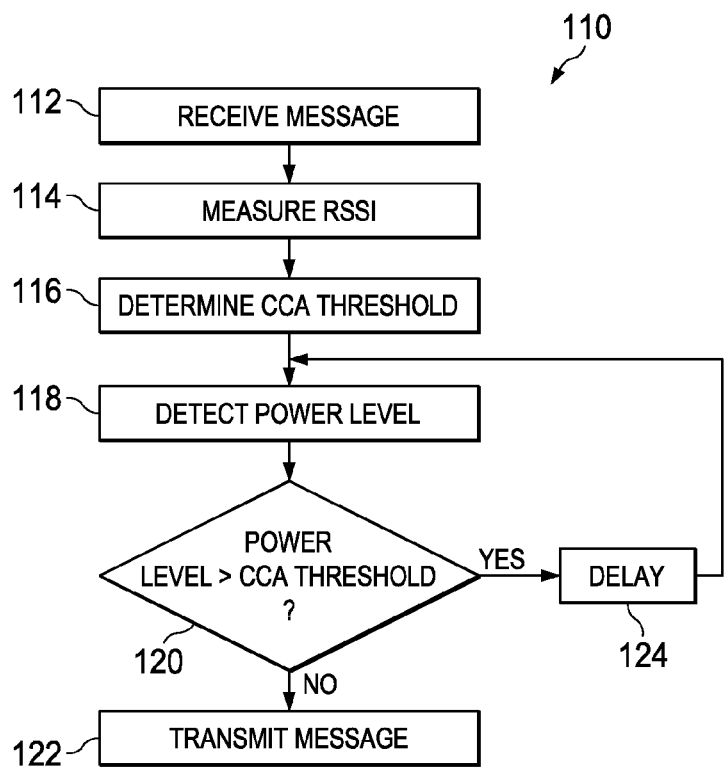
FIG. 2 illustrates an embodiment method for determining a clear channel assessment (CCA) threshold.

FIG. 2 illustrates flowchart 110 for a method of determining a CCA threshold by a station, such as station 104. Stations may each determine their own CCA threshold. In one example, the method illustrated by flowchart 110 may be performed when station 104 associates with AP 102, or during handoff. When a station is associating with an AP, the station may select the closest AP, for example the AP with the highest received signal strength indication (RSSI). In another example, the CCA threshold determination is performed periodically, for example every ten minutes. Alternatively, the CCA threshold is determined non-periodically, for example when station 104 has a packet for transmission to AP 102, changes in the location, changes in the path loss, or interference at the intended receiver.

Initially, in step 112, station 104 receives a message from an AP, such as AP 102. For example, the received message is a beacon frame, a probe response, or an association response received when station 104 is associating with AP 102. Alternatively, the received message is a data transmission or another message. The message may contain an information element. Examples of information elements include the density of access points, the performance of the access point, and the presence or absence of a jamming device.

In response to the received message, in step 114, the Receive Signal Strength Indicator (RSSI) of the received message is determined. Step 114 is performed when the distance between station 104 and AP 102 is used to determine the CCA threshold. Step 114 may be bypassed when other factors are used to determine the CCA threshold.

Then, in step 116, station 104 determines one or more CCA thresholds. One CCA threshold may be determined that is used for all transmissions by station 104. Alternatively, more than one CCA threshold is calculated, and the different CCA thresholds are used for different transmissions. In one example, the CCA threshold is set between −85 dBm and −40 dBm. The CCA threshold may be selected from two CCA values. Alternatively, the CCA threshold is selected from many CCA values, or is chosen among a continuum. The CCA level may be selected based on the intended destination, modulation type, measured background noise, etc.

In one example, the threshold is calculated in accordance with the density of APs. The AP density may be inferred by the communications distance between station 104 and its associated AP, AP 102. A short communications distance may indicate a high density of APs, while a long communications distance may indicate a low density of APs. For example, the communications distance is determined based on the RSSI measured in step 114. When the RSSI is lower than a predefined threshold, the station adopts a first CCA threshold. However, when the RSSI is greater than or equal to the predefined threshold, the station adopts a second CCA threshold. Alternatively, the AP density may be estimated based on the number of APs that station is able to hear. With a higher CCA threshold, a station is less sensitive to surrounding transmissions, so it accesses the channel more aggressively. In one example, the CCA threshold is higher when there is a high density of APs and/or a short distance between the station and its associated AP, because the station can support a higher interference when it is close to the AP. In another example, the CCA threshold is lower when there is a long distance between the station and its associated AP, which helps the performance of stations that are located on the edge of a serving area. In another example, the CCA threshold is set based on the performance of prior transmissions, for example based on the number of retransmissions and/or lost packets. A station may be more cautious by selecting a lower CCA threshold value. Alternatively, the CCA threshold is set based on the station type. For example, a station used by an emergency response team has a high CCA threshold to ensure shorter channel access delay in a case of an emergency.

In step 118, the channel is sensed. The channel sensing procedure is part of the physical layer transmit and receive state machine operation for random access networks. Further discussion of channel sensing is included in the 802.11 standard. Before a transmission, a station assesses whether the channel is IDLE or BUSY. A station is allowed to transmit only if the channel is IDLE.

To determine whether the channel is busy, a station monitors the RF channel collecting the RF signal in step 120. When the signal received power is above the CCA threshold the physical (PHY) layer will report that the channel is busy in 4 µs in step 124, and proceeds to search for a valid PHY preamble. When the channel is IDLE, the station transmits a message in step 122.

When the PHY senses activity on the medium, a PHY-CCA indication primitive with a value of BUSY shall be issued. This may occur during reception of the synchronization (SYNC) field of the PHY preamble. When the PHY senses that the medium is free, a PHY-CCA indication primitive with a value of IDLE shall be issued. At any time, the media access control (MAC) layer may issue a PHY-CCA RESET request primitive, which resets the PHY's internal CCA detection mechanism to the medium not-busy (IDLE) state. This primitive is acknowledged with a PHY-CCA RESET confirm primitive. When the channel is IDLE a station can transmit under the conditions of Dynamic Frequency Selection (DFS). Distributed coordination function (DCF) allows for automatic medium sharing between compatible PHYs through the use of CSMA/CA and a random backoff time following a busy medium condition.

In another example, there is more than one CCA threshold. In an example, the CCA threshold is selected based on the type of message. For instance, a higher CCA threshold may be used for management messages, while a lower CCA threshold is used for data messages. This prioritizes the management traffic. In another example, the priority of a message influences the CCA threshold used. For example, a message from an emergency device, such as a device used by emergency responders, uses a higher CCA threshold. In another example, a different CCA threshold is used for different types of data based on the type of protocol used. For example, data messages transmitted using transmission control protocol (TCP) use a higher CCA threshold, while messages transmitted using user datagram protocol (UDP) use a lower CCA threshold.

In another example, the CCA threshold is adjusted based on the packet delay, i.e. the time between the initial transmission and reception of the acknowledgment of the packet from the receiver. With a lower delay the lower CCA level may be used.

In another embodiment, the CCA threshold is selected based on the quality of service (QoS) class of the packet. High priority messages requiring low latency (video, voice) may be transmitted with a higher CCA, while lower priority messages may use a lower CCA. In this embodiment, the number of CCA thresholds is less than or equal to the number of defined QoS classes.

Figure 3:
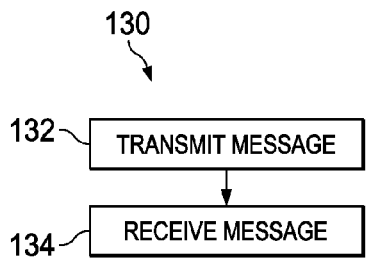
FIG. 3 illustrates another embodiment method for determining a CCA threshold.

FIG. 3 illustrates flowchart 130 for a method of determining a CCA threshold for a station, performed by the station receiving messages from an AP. Initially, in step 132, AP 102 transmits a message to a station. The message may be a beacon frame, a probe response, an association response, a data message, or another type of message. The station adjusts its CCA threshold.

In response, in step 134, AP 102 receives a message from the station in step 134. A message is transmitted by station 104 when station 104 determines an idle channel. A channel may be determined to be IDLE using the described above DCF mechanism.

Figure 4:
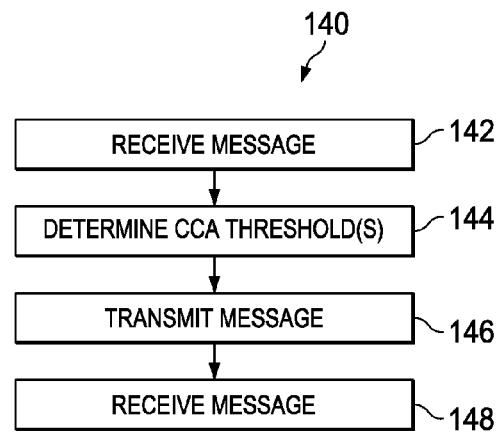
FIG. 4 illustrates an additional embodiment method for determining a CCA threshold.

FIG. 4 illustrates flowchart 140 for a method of determining a CCA threshold by an AP. Initially, in step 142, AP 102 receives a message from a station. In one example, AP 102 receives one message from one station, and proceeds to determine a CCA threshold for that station. In another example, the AP receives multiple messages from multiple stations, and determines the CCA thresholds for multiple stations. The received message may be a probe request, an association request, a data message, or another type of message.

Then, in step 144, the AP determines the CCA threshold for the station. Step 144 may be performed similarly to step 116. For example, the CCA threshold may be determined based on the RSSI of the received message, the density of APs, the channel quality, or the station type. In another example, AP 102 sets the CCA thresholds for multiple stations to shape fairness. For example, if, after a specified period of time, AP 102 notices that there is unfairness among various stations, AP 102 allocates a low threshold to those stations that had more channel access, and allocates a higher CCA threshold to those stations that had less channel access. In another example, AP 102 may force stations to transmit in the presence of a jamming device or in the presence of excess background noise by setting a high CCA threshold. Also, the AP may set the CCA threshold based on its own performance and sensitivity. When the performance and sensitivity of the AP is high, the CCA threshold may also be high.

After determining the CCA threshold for a station, AP 102 transmits a message to that station indicating the CCA threshold in step 146. One CCA threshold, or multiple CCA thresholds, may be transmitted. A CCA threshold may be transmitted to one station or to multiple stations. When a CCA threshold is transmitted to multiple stations, different CCA thresholds may be transmitted to different stations. Alternatively, the same CCA threshold is transmitted to multiple stations.

Then, in step 148, the AP receives a message from the station when the station senses the channel to be IDLE, i.e. when energy level on the channel is determined to be less than the CCA threshold. Multiple messages may be received from one or more than one station.

Figure 5:
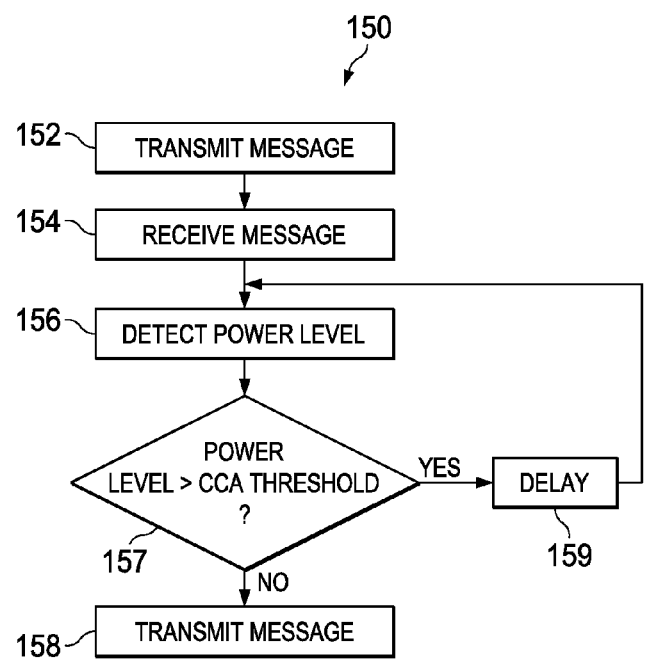
FIG. 5 illustrates another method for determining a CCA threshold.

FIG. 5 illustrates flowchart 150 for a method of determining a CCA threshold for an AP, performed by an AP receiving messages from a station. Initially, in step 152, station 104 transmits a message to AP 102. The message may be a probe request or association request when station 104 wants to associate with AP 102. Alternatively, the message may be a data message, or another type of message.

In response, in step 154, station 104 receives a message from AP 102. The received message indicates the CCA threshold for station 104.

Then, when station 104 wants to transmit a message, it senses the channel in step 156.

Next, in step 157, station 104 compares the CCA threshold to the energy level in the channel. When the level in the channel is less than or equal to the CCA threshold, station 104 transmits the message to AP 102 in step 158. When the energy level in the channel is greater than the CCA threshold, station 104 waits in step 159 as dictated by the CSMA/CA algorithm. After waiting for a period of time, station 104 tries again by sensing the energy level in the channel in step 156.

Figure 6:
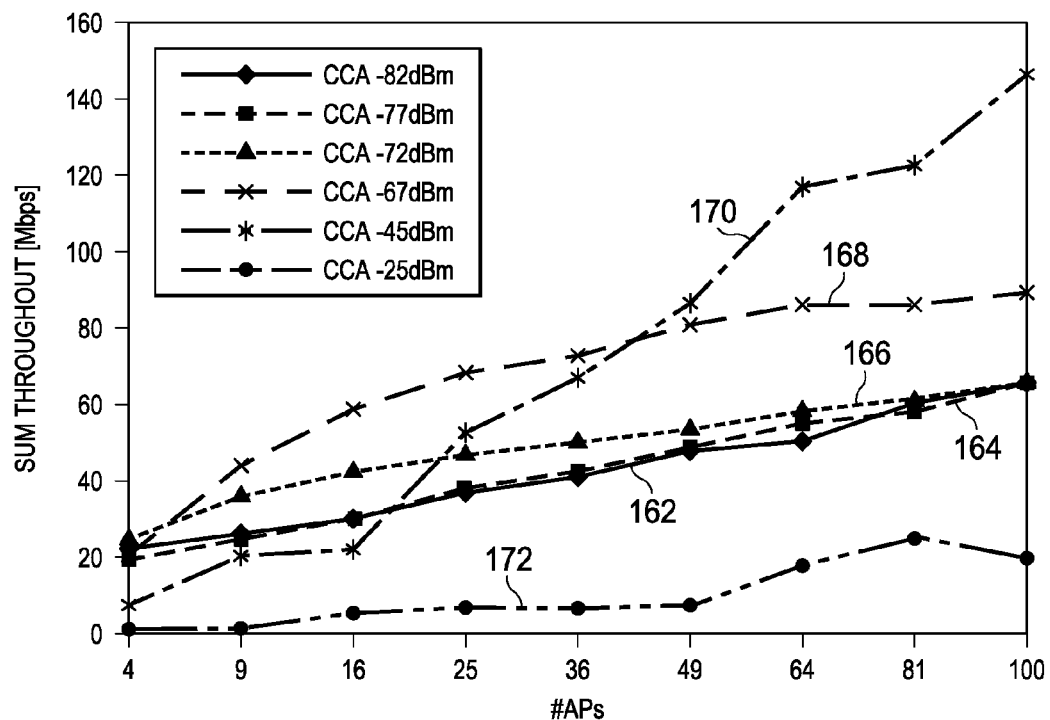
FIG. 6 illustrates a graph of throughput versus the number of access points.

FIG. 6 illustrates graph of throughput in Mbps versus the number of APs for several set of CCA thresholds. Curve 162 shows results for a CCA threshold of −82 dBm, curve 164 shows results for a CCA threshold of −77 dBm, curve 166 shows results for a CCA threshold of −72 dBm, curve 168 shows results for a CCA threshold of −67 dBm, curve 170 shows results for a CCA threshold of −45 dBm, and curve 172 shows results for a CCA threshold of −25 dBm. In a dense environment, increasing the CCA threshold provides a significant increase in throughput. For a high density of APs, for example 49 or more APs in a service area, a CCA threshold of −45 dBm has the best performance. On the other hand, in a low density environment, a smaller CCA threshold is preferred. For a low density of less than or equal to 36 APs in a service area, a CCA threshold of −67 dBm provides the best results.

In one example, the CCA threshold is set to −45 dBm when the RSSI is less than a power threshold and to −67 dBm when the RSSI is greater than or equal to that power threshold. The power threshold is adjusted for each AP serving area based on the distances between APs and a pathloss model. When the transmit power of all the nodes is Pt, the power threshold is given by:

$$P\text{thr}=f(Pt-\text{PL}(d0),\text{Interference}),$$

i.e. a function of transmitted power and path loss PL(d0) between a transmitter and a receiver located d0 apart, and the interference level at the receiver. The simplest function is the ratio of the difference between the transmitted power level and path loss, and the interference level, which is the ratio of the received signal to the interference.

Figure 7:
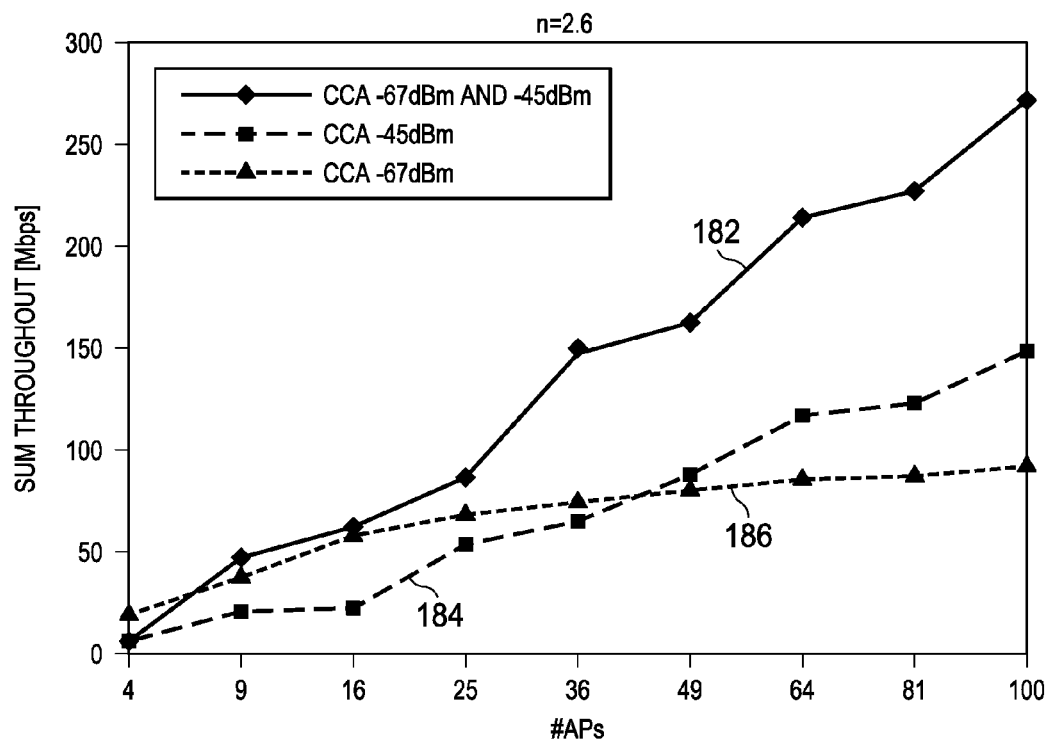
FIG. 7 illustrates another graph of throughput versus the number of access points for pathloss n=2.6.
Figure 8:
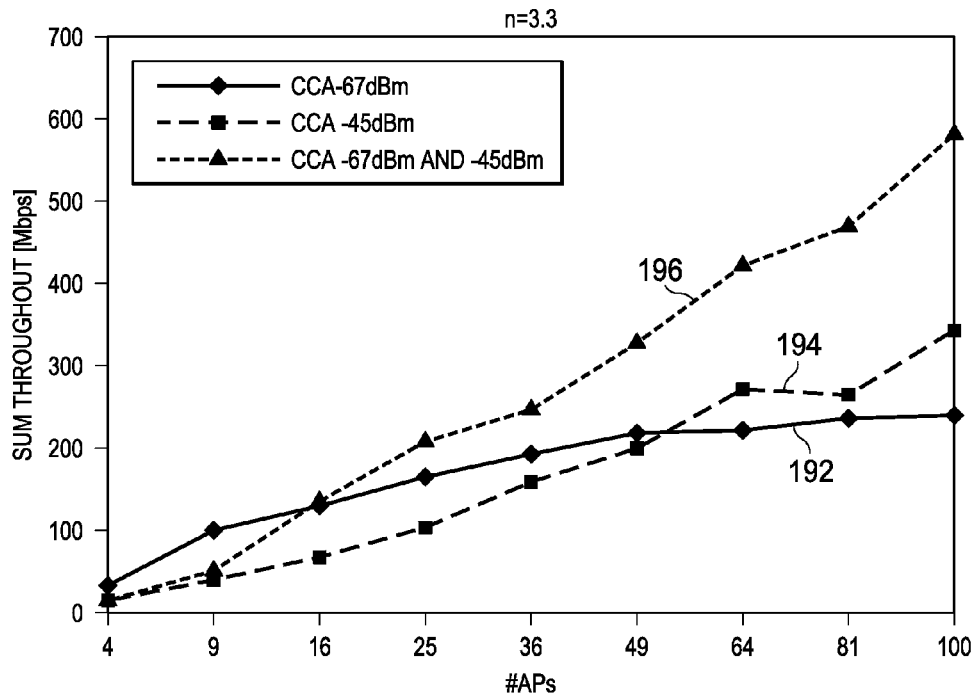
FIG. 8 illustrates an additional graph of throughput versus the number of access points for pathloss n=3.3.
Figure 9:
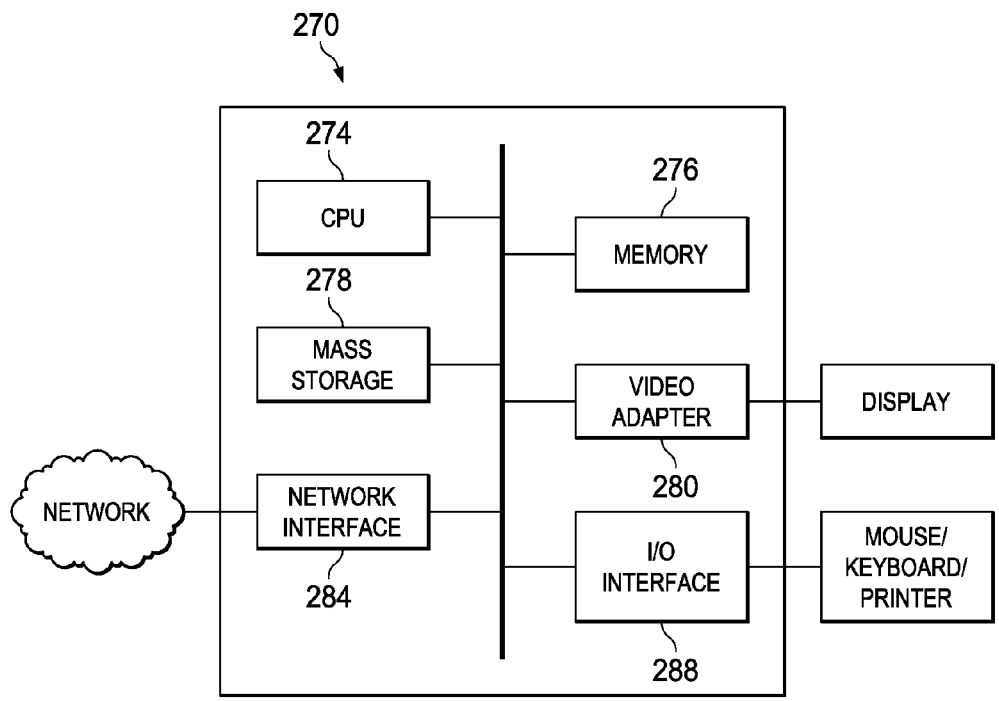
FIG. 9 illustrates a block diagram of an embodiment of a general-purpose computer system.

FIG. 7 and FIG. 8 compare results using this model to a fixed CCA threshold. FIG. 7 shows results for a pathloss of 2.6, and FIG. 8 shows results for a pathloss of 3.3. The threshold distance $d_o$, corresponding to the power threshold $P_{thr}$ is set to 0.25 of the distance between neighboring APs. In FIG. 7, curve 182 shows results for selecting a CCA threshold of −67 dBm or −45 dBm based on the power threshold, curve 184 shows results for a fixed CCA threshold of −45 dBm, and curve 186 shows results for a CCA threshold of −67 dBm. In FIG. 9, curve 196 shows results for selecting a CCA threshold of −67 dBm or −45 dBm based on the power threshold, curve 192 shows results for a fixed CCA threshold of −67 dBm, and curve 194 shows results for a fixed CCA threshold of −45 dBm. There is a throughput improvement of up to 80% for the two level system compared to a one level system. The improvement is especially visible at high AP densities.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for setting a clear channel assessment (CCA) threshold, the method comprising:
   receiving, by a station from a first access point, a first message comprising an information element;
   determining a CCA threshold in accordance with the information element;
   detecting a power level of a channel between the station and the access point to produce a first detected power level;
   comparing the first detected power level and the CCA threshold;
   when the first detected power level is less than the first CCA threshold, detecting a path loss between the station and the access point and generating a second CCA threshold based on the first CCA threshold and the path loss; and
   transmitting, by the station to the first access point on the channel, a second message when the detected power level is less than the CCA threshold, with the second message including the second CCA threshold.

2. The method of claim 1, wherein the information element indicates a density of access points.

3. The method of claim 2, wherein selecting the CCA threshold comprises selecting the CCA threshold in accordance with the density of access points.

4. The method of claim 1, wherein the information element is an indicator of a performance of the first access point.

5. The method of claim 1, wherein the information element is an indicator of a presence or absence of a jamming device.

6. The method of claim 1, further comprising receiving, by the station from a plurality of access points comprising the first access point, a plurality of messages comprising the first message, wherein determining the CCA threshold is further performed in accordance with the plurality of messages.

7. The method of claim 1, wherein the information element is an indicator of a packet delay.

8. The method of claim 1, wherein the information element is an indicator of a quality of service (QoS).

9. The method of claim 1, comprising:
the second threshold is obtained through a function of $P_{thr}=f(P_t-PL(d_0))$ where the power level is $P_t$, the distance between the station and the AP is $d_0$, the path loss between the station and the access point is PL.

10. The method of claim 9, comprising:
the second threshold is obtained based on an interference level at a receiver.

11. A method for setting a clear channel assessment (CCA), the method comprising:
receiving, by a station from an access point, a first message;
determining a first CCA threshold in accordance with the first message;
detecting a power level of a channel between the station and the access point to produce a first detected power level;
selecting the first CCA threshold or a second CCA threshold to produce a selected CCA threshold;
comparing the first detected power level and the selected CCA threshold;
when the first detected power level is less than the first CCA threshold, detecting a path loss between the station and the access point and generating a second CCA threshold based on the first CCA threshold and the path loss; and
transmitting, by the station to the access point on the channel, a second message when the detected power level is less than the selected CCA threshold, with the second message including the second CCA threshold.

12. The method of claim 11, wherein selecting the first CCA threshold or the second CCA threshold comprises selecting the first CCA threshold or the second CCA threshold in accordance with a type of the second message.

13. The method of claim 12, wherein selecting the first CCA threshold or the second CCA threshold comprises selecting the first CCA threshold when the second message is a management message and selecting the second CCA threshold when the second message is a data message, wherein the first CCA threshold is higher than the second CCA threshold.

14. The method of claim 11, wherein selecting the first CCA threshold or the second CCA threshold comprises selecting the first CCA threshold or the second CCA threshold in accordance with a device type of the station.

15. The method of claim 14, wherein selecting the first CCA threshold or the second CCA threshold comprises selecting the first CCA threshold when the station is an emergency device and selecting the second CCA threshold when the station is not an emergency device, wherein the first CCA threshold is higher than the second CCA threshold.

16. The method of claim 11 wherein selecting the first CCA threshold or the second CCA threshold is performed in accordance with a communications protocol of the channel.

17. The method of claim 16, wherein selecting the first CCA threshold or the second CCA threshold comprises selecting the first CCA threshold when the communications protocol is transmission control protocol (TCP) and selecting the second CCA threshold when the communications protocol is user datagram protocol (UDP), wherein the first CCA threshold is higher than the second CCA threshold.

18. The method of claim 11, wherein determining the second CCA threshold further comprises determining the second CCA threshold in accordance with the first message.

19. The method of claim 11, further comprising receiving, by the station from the access point, a third message, wherein determining the second CCA threshold comprises determining the second CCA threshold in accordance with the third message.

20. The method of claim 11, comprising:
the second threshold is obtained through a function of $P_{thr}=f(P_t-PL(d_0))$ where the power level is $P_t$, the distance between the station and the AP is $d_0$, the path loss between the station and the access point is PL.

21. The method of claim 20, comprising:
the second threshold is obtained based on an interference level at a receiver.

22. A method for setting a clear channel assessment (CCA) threshold, the method comprising:
receiving, by an access point from a first station, a first message;
receiving, by the access point from a second station, a second message;
detecting a first path loss between the first station and the access point;
detecting a second path loss between the first station and the access point;
determining a first CCA threshold for the first station in accordance with the first path loss, the first message, the second message, and fairness between the first station and the second station;
determining a second CCA threshold for the second station in accordance with the second path loss, the first message, the second message, and fairness between the first station and the second station;
transmitting, by the access point to the first station, a third message comprising the first CCA threshold; and
transmitting, by the access point to the second station, a fourth message comprising the second CCA threshold.

23. The method of claim 22, further comprising detecting a presence or absence of a jamming device, wherein determining the first CCA threshold is further performed in accordance with the presence or absence of the jamming device.

24. The method of claim 22, wherein determining the first CCA threshold is performed in accordance with a performance of the access point.

25. The method of claim 22, further comprising determining a density of access points, wherein determining the first CCA threshold is further performed in accordance with the density of access points.

26. The method of claim 22, comprising:
the second threshold is obtained through a function of $P_{thr}=f(P_t-PL(d_0))$ where the power level is $P_t$, the distance between the station and the AP is $d_0$, the path loss between the station and the access point is PL.

27. The method of claim 26, comprising:
the second threshold is obtained based on an interference level at a receiver.

28. A station comprising:
a processor; and
a computer readable storage medium storing programming for execution by the processor,
the programming including instructions to
- receive, from an access point, a first message comprising an information element,
- determine a CCA threshold in accordance with the information element,
- detect a power level of a channel by the station to produce a first detected power level,
- compare the first detected power level and the CCA threshold,
- when the first detected power level is less than the first CCA threshold, detecting a path loss between the station and the access point and generating a second CCA threshold based on the first CCA threshold and the path loss; and
- transmit, to the access point on the channel, a second message when the detected power level is less than the CCA threshold, with the second message including the second CCA threshold.

* * * * *